March 3, 1936.  A. BERCHTOLD  2,032,905
TIRE FOR VEHICLE WHEELS
Filed Nov. 14, 1933
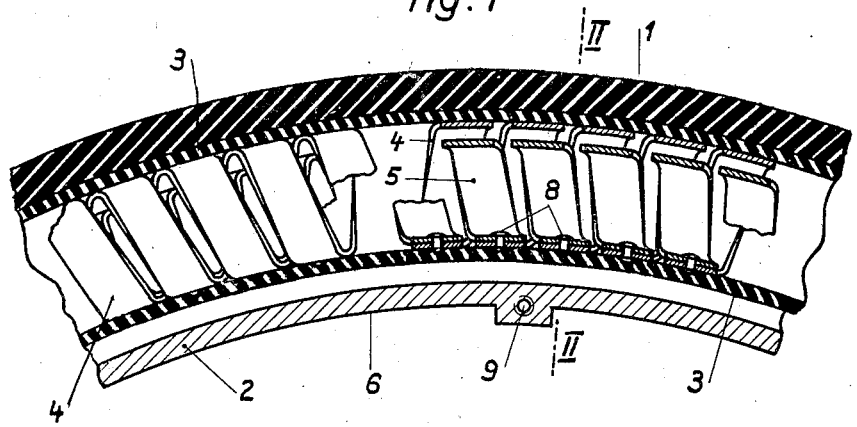
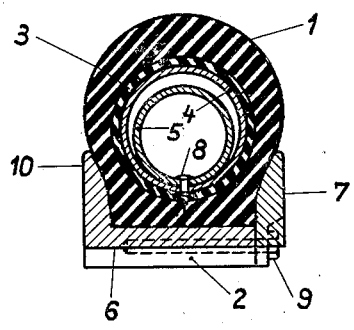 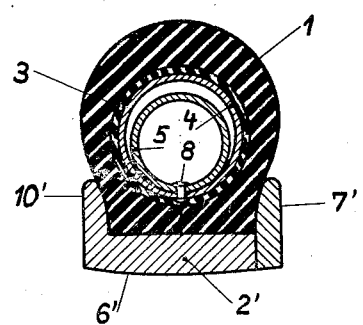
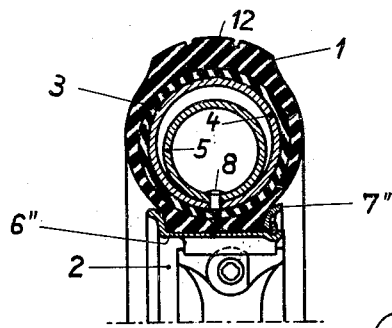
Inventor
Albert Berchtold
By B. Singer, Atty.

Patented Mar. 3, 1936

2,032,905

UNITED STATES PATENT OFFICE 2,032,905

TIRE FOR VEHICLE WHEELS

Albert Berchtold, Zurich-Oerlikon, Switzerland

Application November 14, 1933, Serial No. 697,993
In Switzerland November 25, 1932

2 Claims. (Cl. 152—8)

The present invention relates to vehicle tires and more especially to tires to be used for bicycles, motorcycles and motor-cars.

The prime object of the invention is to obviate the well known drawbacks of the tires having air-filled tubes, chambers filled with compressed air and so on.

I attain this object by placing at least one coiled spring shaped to form a closed ring within a mantle of rubber and to attach the latter on the wheel body.

In a preferred mode of construction I place two coiled springs, one within the other with sufficient play to allow the outer spring to flex under load and in such a manner that the outer spring comes to bear on the inner spring if the load exceeds a certain predetermined limit. The stress is distributed thereby on a great number of windings.

With these and other objects in view the invention consists in the particular construction as described hereinafter with reference to the annexed drawing.

In the accompanying drawing:

Fig. 1 shows part of the tire in sectional elevation,

Fig. 2 is a section on line II—II of Fig. 1.

Figs. 3 and 4 show in a cross-section each a modified construction.

The tire shown in Figs. 1 and 2 comprises a casing 1 of rubber which is fastened to the felloe 2. In the casing a tube 3 of rubber is placed and within said tube 3 two coiled springs 4 and 5 of steel or any other suitable material are placed one within the other. The ends of each spring may be connected with each other for instance by riveting or otherwise. The springs 4 and 5 are preferably of steel bands or strips having rectangular or approximately rectangular cross-section. The diameters of the windings of the spring is rather less than that of spring 4. The two springs 4, 5 may have like pitch but they are different wound. Some or all of the windings of the two springs are interconnected by rivets 8. A space is left between the springs 4 and 5 at the top of the spring 5 allowing the outer spring 4 some play when the wheel is running under load. If the load exceeds a certain limit, the windings of spring 4 come to rest on those of spring 5, both the springs 4 and 5 carry now the load. The load is spread over a comparatively large number of windings and none of the springs will be overstressed, when the wheel is running under normal load.

The felloe comprises two annular parts 6 and 7. The part 6 is of angular cross-section, the part 7 forms a flange fixed by screw bolts 9 to the part 6. The tire is securely held between flange 10 and the ring 7.

As shown in Fig. 3 the casing 1 may be varied. The base of the mantle may be strengthened, the walls of the casing resting on the felloe 2' are thicker and the flanges 7' and 10' are lower as shown in Fig. 2. The ring 7' may be fastened to the part 6' by screws or by any other means which allow a quick assembling. The felloe may be mounted on the wheel body in any well known manner.

As shown in Fig. 4 the felloe may be formed in a manner well known in motorcar wheel construction. The annular parts 6'' and 7'' are of rolled steel, the ring 6'' is fastened on the spokes of the wheel body by well known means. The tread portion 12 of the tire is strengthened and flattened to give a good gripping face; it is moreover grooved in a conventional manner.

In all of the constructions shown and described one of the springs is embedded in rubber by a suitable vulcanizing process.

What I wish to secure by Letters Patent is:

1. In a resilient tire, an inner tube, a helical spring with spaced windings within said inner tube and engaging the inner wall thereof, a second helical spring of smaller diameter than said first mentioned spring arranged eccentrically within the latter, the windings of said second spring engaging the inner face of the windings of said first named spring where the latter engages the inner periphery of said inner tube, and means for directly securing the windings of said two springs with each other where the same engage one another.

2. In a resilient tire, an inner tube, a helical spring having spaced windings within said inner tube and vulcanized to the inner wall thereof, a second helical spring having spaced windings of smaller diameter than said first named spring and wound in the opposite direction, said second spring being eccentrically arranged within said first named spring so that its windings engage the cross the windings of said first named spring at points located in a circular path extending substantially along the inner periphery of said inner tube, and means for securing the windings of said second spring to the inner face of the windings of said first named spring where said windings engage and cross each other.

ALBERT BERCHTOLD.